United States Patent
Zhang et al.

(10) Patent No.: US 10,578,023 B2
(45) Date of Patent: Mar. 3, 2020

(54) CONTROLLING A WATER BATH HEATER FOR FUEL GAS

(71) Applicant: General Electric Company, Schenectady, NY (US)

(72) Inventors: Hua Zhang, Greer, SC (US); Dean Matthew Erickson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 15/496,347

(22) Filed: Apr. 25, 2017

(65) Prior Publication Data
US 2018/0306119 A1    Oct. 25, 2018

(51) Int. Cl.
*F02C 7/224*    (2006.01)

(52) U.S. Cl.
CPC .................................. *F02C 7/224* (2013.01)

(58) Field of Classification Search
CPC .......... F02C 7/224; F02C 7/22; F01N 3/0205; F24H 1/0081
See application file for complete search history.

(56) References Cited

U.S. PATENT DOCUMENTS

| 8,459,033 B2 | 6/2013 | Erickson et al. |
| 8,572,975 B2 * | 11/2013 | Bilton ..................... F02C 7/224 60/736 |
| 2010/0307157 A1 | 12/2010 | Bilton et al. |

* cited by examiner

*Primary Examiner* — Gregory A Wilson
(74) *Attorney, Agent, or Firm* — Dale Davis; Hoffman Warnick LLC

(57) ABSTRACT

Embodiments of the present disclosure include methods, systems and program products for controlling a water bath heater for a fuel gas. Methods according to the present disclosure can include: calculating at least one calculable condition of the fuel gas based on a set of conditions of the fuel gas entering the water bath heater and a type of control valve located downstream of the water bath heater; calculating a target temperature differential for the fuel gas based a set of conditions of the fuel gas entering the water bath heater and the at least one calculable condition; and adjusting an operating parameter of the water bath heater to adjust a temperature of the fuel gas leaving the water bath heater by the target temperature differential.

20 Claims, 5 Drawing Sheets

CONTROLLING A WATER BATH HEATER FOR FUEL GAS

BACKGROUND

The disclosure relates generally to control systems and methods for a water bath heater. More specifically, the present disclosure relates to controlling a water bath heater for adjusting the temperature of a fuel gas to reduce the power consumption of the water bath heater.

Gas turbine power plants generally incorporate fuel gas delivery systems to supply fuel gas for the gas turbines. The pipeline pressure of the fuel gas delivery systems may at times need to be reduced, for example, when the pressure reaches 1500 pounds per square inch (psi). Pressure reduction stations may be incorporated to reduce the pipeline pressure of the fuel gas. Decreasing the pipeline pressure of the fuel gas may result in the formation of ice and hydrate due to the Joule-Thompson effect of the pressure change created by the control valve types and configurations used in the pressure reduction stations. Build-up of ice and hydrate within the system may cause a significant pressure drop and clog the pipe line to interrupt fuel supply to power plant.

Conventional solutions to prevent the formation of ice and hydrate, and therefore significant drops in fuel gas supply pressure to power plant, can include modified valve designs, and super heating the fuel gas via water bath heater before it reaches the pressure reduction station. For example, conventional super heating systems may incorporate an on/off control switch for controlling heat application to the fuel gas by a constant temperature increase assuming the worst case scenario, irrespective of the actual required temperature increase for preventing ice and hydrate formation. Such systems may decrease the pipeline pressure of the fuel gas, and/or increase power plant energy consumption and operational costs.

SUMMARY

A first aspect of the disclosure provides a method for controlling a water bath heater for a fuel gas, the method including: calculating at least one calculable condition of the fuel gas based on at least one first condition of the fuel gas entering the water bath heater and a type of control valve located downstream of the water bath heater; calculating a target temperature differential for the fuel gas based on at least one second condition of the fuel gas entering the water bath heater and the at least one calculable condition; and adjusting an operating parameter of the water bath heater to adjust a temperature of the fuel gas leaving the water bath heater by the target temperature differential.

A second aspect of the disclosure provides a system for controlling a water bath heater for fuel gas, the system including: a system controller in communication with a monitoring system of the water bath heater for a fuel gas, the system controller being operable to: calculate at least one calculable condition of the fuel gas based on at least one first condition of the fuel gas entering the water bath heater and a type of control valve located downstream of the water bath heater; calculate a target temperature differential for the water bath heater based on at least one second condition of the fuel gas entering the water bath heater and the at least one calculable condition of the fuel gas; and adjust an operating parameter of the water bath heater to adjust a temperature of the fuel gas leaving the water bath heater by the target temperature differential.

A third aspect of the invention provides a program product stored on a computer readable storage medium for controlling a water bath heater for a fuel gas, the computer readable storage medium including program code for causing a computer system to: at least one calculable condition of the fuel gas based on at least one first condition of the fuel gas entering the water bath heater and a type of control valve located downstream of the water bath heater; calculate a target temperature differential for the fuel gas based on at least one second condition of the fuel gas entering the water bath heater and the at least one calculable condition of the fuel gas; and adjust an operating parameter of the water bath heater to adjust a temperature of the fuel gas leaving the water bath heater by the target temperature differential.

BRIEF DESCRIPTION OF THE DRAWINGS

These and other features of the disclosed system will be more readily understood from the following detailed description of the various aspects of the system taken in conjunction with the accompanying drawings that depict various embodiments, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION

Figure 1:
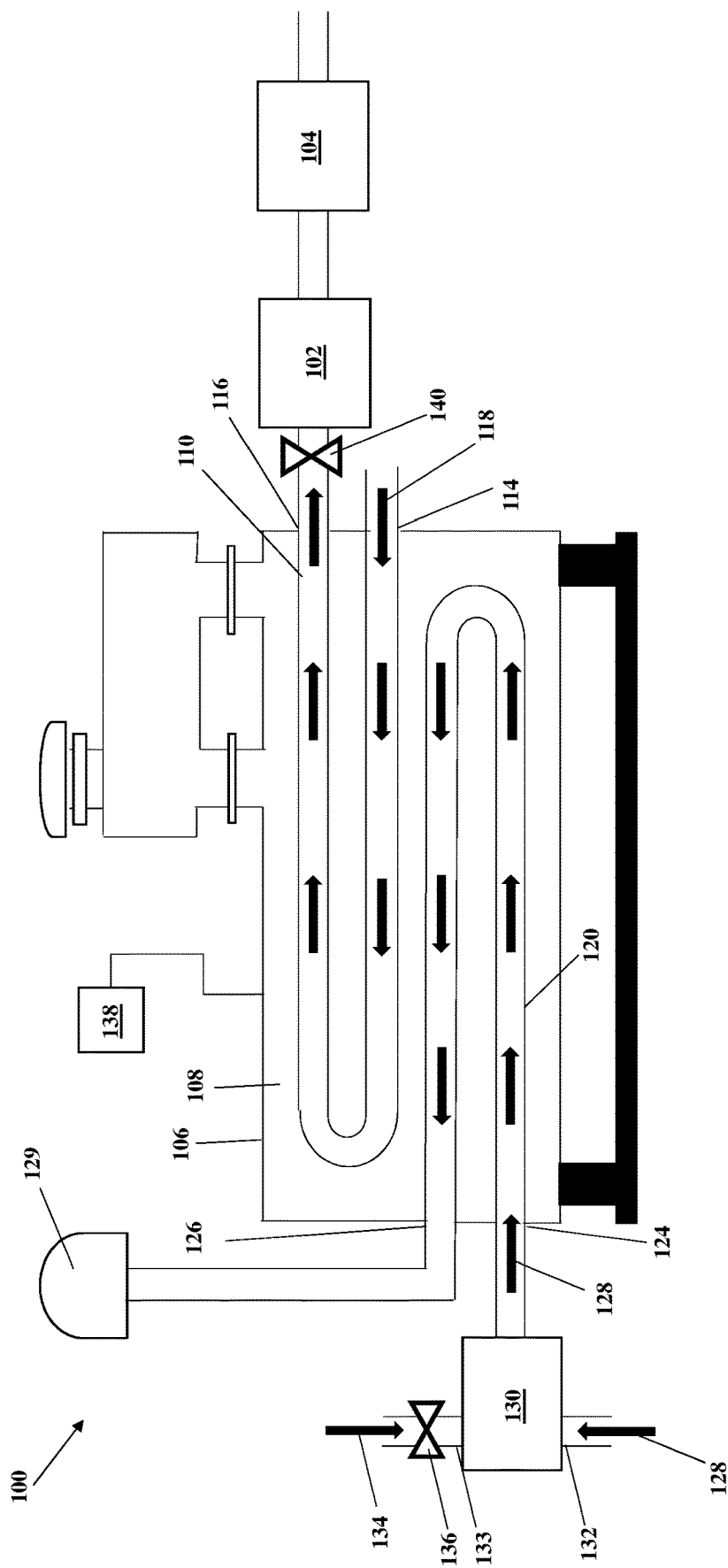
FIG. 1 is a schematic view of a conventional water bath heater for a pressure reduction station of a gas turbine power plant.

In the following description, reference is made to the accompanying drawings that form a part thereof, and in which is shown by way of specific illustrative embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Embodiments of the present disclosure provide for the active control of a water bath heater for preventing hydrate and/or ice formation in a gas turbine power plant pressure reduction station. Processes according to the disclosure can include applying an analysis program of a water bath heater to calculate a target temperature differential for a fuel gas to prevent hydrate and/or ice formation during a pressure reduction process downstream of the water bath heater. Further processes can include continuously adjusting an operating parameter of the water bath heater based on the target temperature differential, rather than a super heating temperature, to reduce power consumption of the water bath heater.

Embodiments of the present disclosure may also apply an analysis program of a water bath heater to calculate attributes of degradation of components of a water bath heater and/or pressure reduction station and/or gas turbine power plant, which can then be compared with their actual values to determine whether to adjust a parameter of the water bath heater. The term "degradation model" can include any equation, system of equations, matrix, algorithm, and/or mathematical model which relates one or more sets of inputs to various operating parameters and internal conditions of the component, including internal conditions of a fluid path through the component. In an example embodiment, methods of controlling a water bath heater can include calculating a set of conditions of fuel gas, where the calculated conditions in the set correspond to degradation of the component. The calculated conditions generally refer to physical properties (e.g., temperature, pressure, flow rate) of the fuel gas within the component. More specifically, a calculated condition quantifies such properties within the component. The degradation model may predict one or more quantities representing degradation of the component, and these predicted quantities may differ from actual measured values for the component. To reconcile these differences, embodiments of the present disclosure include adjusting an operating parameter of the water bath heater based on a difference between the predicted values yielded from the degradation model and the measured conditions. Adjusting an operating parameter of the water bath heater may include, for example, adjusting a position of a control valve of the water bath heater to control the flow of a burner fuel gas supply and thereby, for example, mitigating the hydrate and/or ice formation causing degradation of the component.

FIG. 1 shows a conventional water bath heater 100 connected to a pressure reduction station 102 for a gas turbine power plant (GT power plant) 104. Water bath heater 100 includes a main body 106 filled with bath fluid 108. Bath fluid 108 surrounds a first pipeline 110 and second pipeline 120 running through the main body 106 of the water bath heater. First pipeline 110 includes an inlet 114 and outlet 116. Inlet 114 may be connected to a supply (not shown) of fuel gas 118 for GT power plant 104. Outlet 116 leads downstream to pressure reduction station 102 including control valve 140. GT power plant 104 is connected downstream of pressure reduction station 102. Second pipeline 120 includes an inlet 124 and outlet 126. Inlet 124 is connected to a burner 130. Burner 130 includes a first inlet 132 for flue gas 128 and a second inlet 133 for burner fuel gas supply 134. Inlet 133 may include a valve 136 for controlling the flow of burner fuel gas supply 134 to burner 130. Outlet 126 is connected to a flue stack 129 to allow the release of flue gas 128. Water bath heater 100 also conventionally includes a conventional controller 138 for controlling the position of valve 136 increase the temperature of fuel gas 118 significantly above the hydrate formation temperature the fuel gas by a set temperature rise, typically 50 degree Fahrenheit (° F.).

Water bath heater 100 may be used, for example, to increase the temperature of fuel gas 118 to prevent hydrate and/or ice formation at pressure reduction station 102 downstream of water bath heater 100. For example, fuel gas 118 may enter water bath heater 100 at inlet 114 of first pipeline 110. Fuel gas 118 may run through main body 106 of water bath heater 100, i.e. through first pipeline 110, and exit water bath heater 100 through outlet 116 of first pipeline 110. Fuel gas 118 may travel downstream, for example to pressure reduction station 102, and subsequently to GT power plant 104. Further, for example, while fuel gas 118 is running through water bath heater 100, flue gas 128 may enter burner 130 at inlet 132. Flue gas 128 may enter second pipeline 120 of water bath heater 100 at inlet 124, run through main body 106 of water bath heater 100 via second pipeline 120, and exit water bath heater 100 through outlet 126 to flue stack 129. Burner 130 may be used to increase the temperature of flue gas 128 as it enters second pipeline 120. For example, triggering the on-condition of conventional controller 138 of water bath heater 100 may cause burner 130 to turn on, allowing burner fuel gas supply 134 to enter burner 130 at inlet 133 and thereby increase the temperature of flue gas 128. The temperature increase of flue gas 128 traveling through second pipeline 120 may result in an increase in the temperature of bath fluid 108 in main body 106 of water bath heater 100. The increase in the temperature of bath fluid 108 may then result in an increase in the temperature of fuel gas 118 traveling through first pipeline 110 before fuel gas 118 reaches a control valve 140, downstream of water bath heater 100. Water bath heater 100 is conventionally used to continuously super heat fuel gas 118 to a set temperature significantly above the hydrate formation temperature of the fuel gas.

Figure 2:
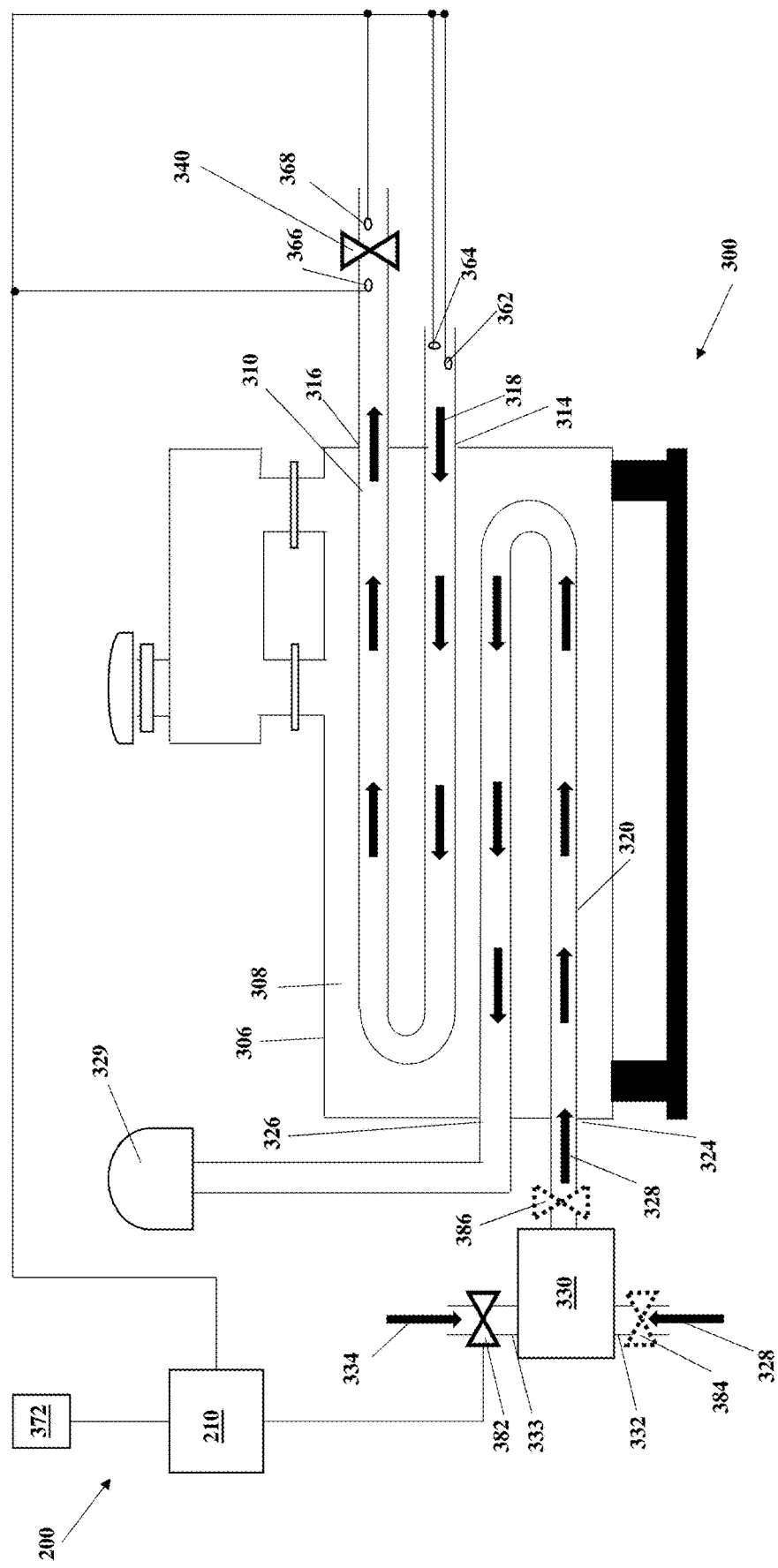
FIG. 2 is a schematic view of a water bath heater with a system for controlling the water bath heater according to embodiments of the present disclosure.

Turning to FIG. 2, a system 200 for controlling water bath heater 300 (e.g. water bath heater 100 of FIG. 1) according to embodiments of the present disclosure is shown. System 200 can include and/or interact with water bath heater 300, for example, to continuously adjust an operating parameter of water bath heater 300 and continuously adjust the temperature of fuel gas 318 for a GT power plant by a target temperature differential for preventing hydrate and/or ice formation during a pressure reduction process. System 200 may therefore also reduce the power consumption of water bath heater 300, e.g., by offering additional control over the amount of heating.

During operation, operational fluids may flow through water bath heater 300 and/or pressure reduction station 102 (see FIG. 1) and/or GT power plant 104 (see FIG. 1). An "operational fluid" may include any fluid transmitted to and used within water bath heater 300 and/or pressure reduction station 102 (see FIG. 1), and/or GT power plant 104 (see FIG. 1) and/or any other component of a power plant during operation. For example, an operational fluid in the form of fuel gas 318 for gas turbine power plant 104 (see FIG. 1) may, for example, enter first pipeline 310 of water bath heater 300 at inlet 314 of first water bath heater 300 from a fuel gas supply (not shown), travel through main body 306 of water bath heater 300 via first pipeline 310, exit water bath heater 300 at outlet 316 of first pipeline 310, and travel downstream to pressure reduction station 102 (see FIG. 1) and/or GT power plant 104 (see FIG. 1). Additionally, in another example, air 328 may, for example, enter inlet 332 of burner 330, enter inlet 324 of second pipeline 320, travel through main body 306 of water bath heater 300 via second pipeline 320 to change the temperature of bath fluid 308, exit main body 306 of water bath heater 300 at outlet 326 of second pipeline 320, and exit water bath heater at flue stack 329.

A "condition" of operational fluids (e.g. fuel gas 318) within water gas heater 300 and/or pressure reduction station 102 (see FIG. 1) and/or GT power plant 104 (see FIG. 1), as described herein, generally refers to any single quantifiable property or group of quantifiable properties pertaining to the operational fluids. As examples, conditions can include without limitation, a temperature (expressed, e.g., in degrees Celsius (° C.), and/or a pressure (expressed, e.g., in Pascals (Pa)). Other types of conditions may include, for example, fluid velocity, kinetic energy, mass flow rate, volumetric flow rate, volumetric flux, fluid density, fluid momentum, viscosity, and dimensionless properties derived from one or more other conditions.

To control the operation of water bath 300 embodiments of system 200 may include, for example, a controller 210 coupled to various sensors, valves, etc., of water bath heater 300 and/or pressure reduction station 102 (see FIG. 1) and/or GT power plant 104 (see FIG. 1) to determine and control various aspects of water bath heater 300 as discussed herein. Controller 210 can generally include any type of computing device capable of performing operations by way of a processing component (e.g., a microprocessor) and as examples can include a computer, computer processor, electric and/or digital circuit, and/or a similar component used for computing and processing electrical inputs. Example components and operative functions of controller 210 are discussed in detail elsewhere herein.

One or more sensors can be in communication with controller 210 and may be positioned, for example, within corresponding areas of water bath heater 300, and/or pressure reduction system 102 (see FIG. 1) and/or GT power plant 104 (see FIG. 1) and/or any other desirable location where conditions of operational fluids can be measured or examined Examples of locations, without limitation, may include: inlet 314 and/or outlet 316 of first pipeline 310, inlet 324 and/or outlet 326 of second pipeline 320, etc. As shown in FIG. 2, sensors may include, for example, sensors 362, 364, 366, 368. Each sensor 362, 364, 366, 368 can be configured to determine (e.g., by direct measurement and/or calculation from related variables) various quantities such as the conditions of the operational fluids (e.g., the temperature and/or pressure of fuel gas 318 entering inlet 314 of first pipeline 310), etc., to calculate additional conditions of the operational fluid(s), e.g. hydrate formation temperature of fuel gas 318. Sensor(s) 362, 364, 366, 368 may be in direct and/or indirect communication with controller 210 by any now known or later developed techniques. For example, sensors 362, 364, 366, 368 may use a server (not shown) to communicate with controller 210. In another example, sensors 362, 364, 366, 368 may be in direct communication with controller 210 by a direct connection (not labeled).

A variety of sensors can be used in embodiments of the present disclosure. Sensor(s) 362, 364, 366, 368 can be in the form of temperature sensor(s), pressure sensor(s), and/or other devices for evaluating the properties of the operational fluids at a particular location. For example, sensor 362 may include a temperature sensor. Sensors in the form of a temperature sensor can include thermometers, thermocouples (i.e., voltage devices indicating changes in temperature from changes in voltage), resistive temperature-sensing devices (i.e., devices for evaluating temperature from changes in electrical resistance), infrared sensors, expansion-based sensors (i.e., sensors for deriving changes in temperature from the expansion or contraction of a material such as a metal), and/or state-change sensors. Where one or more sensors include temperature sensors, the temperature of fluid(s) passing through the location of the sensor(s) can be measured and/or converted into an electrical signal or input relayed to controller 210. In another example, sensor(s) 364, 366, 368 may include pressure sensors. Sensors in the form of pressure sensors can include barometers, manometers, tactile pressure sensors, optical pressure sensors, ionizing pressure sensors, etc.

Sensor(s) 362, 364, 366, 368 may also derive one or more conditions from other measured quantities, e.g., temperature, pressure, flow rate, etc. These measured quantities, in turn, can be measured at multiple positions of water bath heater 300 and/or pressure reduction station 102 (see FIG. 1) and/or GT power plant 104 (see FIG. 1) and applied to mathematical equations for other conditions of the operational fluids, e.g., via controller 210. In this case, sensor(s) 362, 364, 366, 368 can include components for measuring variables related to temperature and/or pressure or other metrics, and processing components (e.g., computer software) for prediction and/or calculating values of temperature and/or pressure or other metrics based on the related variables. In general, the term "calculating" in the context of sensor(s) 362, 364, 366, 368 refers to the process of mathematically computing a particular value by direct measurement, predictive modeling, derivation from related quantities, and/or other mathematical techniques for measuring and/or finding a particular quantity. In any event, the conditions measured by each sensor(s) 362, 364, 366, 368 can be indexed, tabulated, etc., according to a corresponding time of measurement. As is discussed elsewhere herein, controller 210 can act as a "pseudo-sensor" for calculating (e.g., by estimation or derivation) one or more other conditions of operational fluids at positions within water bath heater 300 and/or pressure reduction station 102 (see FIG. 1) and/or GT power plant 104 (see FIG. 1) which do not include sensor(s) 362, 364, 366, 368.

In addition to sensors 362, 364, 366, 368, one or more interfaces may be in communication with controller 210 and can be positioned, e.g. within corresponding areas of water bath heater 300, and/or pressure reduction station 102 (see FIG. 1) and/or GT power plant 104 (see FIG. 1) and/or any other desirable location for entering input into the interface. As shown in FIG. 2, interface 372 may be in communication with controller 210. Each interface, e.g. interface 372, can be configured to determine and/or receive various inputs such as the identification of components of water bath heater 300 and/or pressure reduction station 102 (see FIG. 1) and/or GT power plant 104 (see FIG. 1), etc., to calculate other conditions of the operational fluids. For example, interface 372 may be configured to determine and/or receive input regarding the identification of valve type for control valve 340 downstream of water bath heater 300. Interface 372 may include any now known or later developed device for determining and/or analyzing input. Interface 372 may be in direct and/or indirect communication with controller 210 by any now known or later developed techniques for allowing an interface to be in communication with a controller. For example, interface 372 may utilize a server to communicate with controller 210. In another example, interface 372 may be in direct communication with controller 210 by a direct connection (not labeled).

Water bath heater 300 and/or pressure reduction station 102 (see FIG. 1) and/or GT power plant 104 (see FIG. 1) and system 200 can include one or more control valves positioned to adjust various aspects of water bath heater 300 during operation. For example, valve 382, may be between burner fuel gas supply 334 and inlet 333 of burner 330 to adjust the flow of burner fuel gas supply 334 to burner 330 of water bath heater 300. Although control valves 382, 384, 386 are shown by example of being positioned proximal to inlets 333 and 332 of burner 330, and inlet 324 of second pipeline 320, respectively, control valves 382, 384, 386 and any other desirable number of control valves may be positioned in other portions of water bath heater 300. For example, control valves may be positioned in any desirable location to affect the flow rate of operational fluids entering or leaving water bath heater 300, and/or other portions of water bath heater 300 where operational fluid flows (e.g. burner 330).

Regardless of which control valve(s) 382, 384, 386 are manipulated, one or more variables such as the amount, temperature, flow rate, etc., of operational fluids within water bath heater 300 can be affected by adjusting the position of control valve(s) 382, 384, 386 as described herein. For example, as shown in FIG. 2, control valve 382 may control an amount or fraction of burner fuel gas supply 334 entering burner 330 of water bath heater 300, and more specifically can govern the rate at which burner fuel gas supply 334 is introduced to burner 330 from a preceding component. In another example, control valve 384 (in phantom) may control an amount or fraction of air 328 entering burner 330 of water bath heater 300, and more specifically can govern the rate at which air 328 is introduced to burner 330 from a preceding component. In another example, control valve 386 (in phantom) may control an amount or fraction of air 328 entering second pipeline 320 of water bath heater 300, and more specifically can govern the rate at which air 328 is introduced to second pipeline 320 of water bath heater 300 from a preceding component. Although three control valves are shown in FIG. 2 of water bath heater 300, it is understood that any desirable number of control valves may be positioned in any desirable location to control operational fluids entering and/or leaving water bath heater 300.

As discussed herein, controller 210 may be operably coupled to a component of water bath heater 300 to adjust an operating parameter of the water bath heater. For example, controller 210 such that controller 210 may be operably coupled to control valves 382, 384, 386 to govern the position of the control valves during operation of water bath heater 300. Controller 210, more specifically, can adjust a position of control valves 382, 384, 386 based on conditions of operational fluids (e.g. fuel gas 318) and identification of component types (e.g. control valve 340), detected and/or determined by sensor(s) 362, 364, 366, 368 and/or interface 372. In an example embodiment, shown in FIG. 2, controller 210 can adjust a position of control valve 382 based on at least one calculable condition of fuel gas 318 and/or at least one type of component and/or at least one other condition of fuel gas 318, yielded from sensor(s) 362, 364, 366, 368 and/or interface 370. Alternatively, controller 210 can adjust a position of valve 384 (in phantom) based on at least one calculable condition of fuel gas 318 and/or at least one type of component and/or at least one analyzed condition of fuel gas 318, yielded from sensor(s) 362, 364, 366, 368 and/or interface 370. In a further example, controller 210 can adjust a position of valve 386 (in phantom) based on at least one calculable condition of fuel gas 318 and/or at least one type of component and/or at least one analyzed condition of fuel gas 318, yielded from sensor(s) 362, 364, 366, 368 and/or interface 370.

In addition to directly controlling a flow rate of fluids (e.g. burner fuel gas supply 334 and/or air 328) entering and/or leaving burner 330, control valves 382, 384, 386 can also affect other properties such temperature, pressure, etc., in various portions of water bath heater 300 and/or pressure reduction station 102 (see FIG. 1) an/or GT power plant 104 (see FIG. 1), hydrate and/or ice formation at pressure reduction station 102 (see FIG. 1), etc. Although the examples described herein include control valves, controller 210 may be operably coupled to any component of water bath heater 300 to adjust any desirable operating parameter of the water bath heater. To this end, controller 210 can include program code installed by a user which includes mathematical equation(s) for relating one or more conditions of operational fluids and/or component types (e.g., input conditions, conditions downstream and/or upstream of water bath heater 300, control valve types etc.) to operating parameters of water bath heater 300 in order to continuously adjust the temperature of fuel gas 318 to prevent hydrate and/or ice formation during a pressure reduction process downstream of water bath heater 300 and therefore may also decrease power consumption of water bath heater 300.

Figure 3:
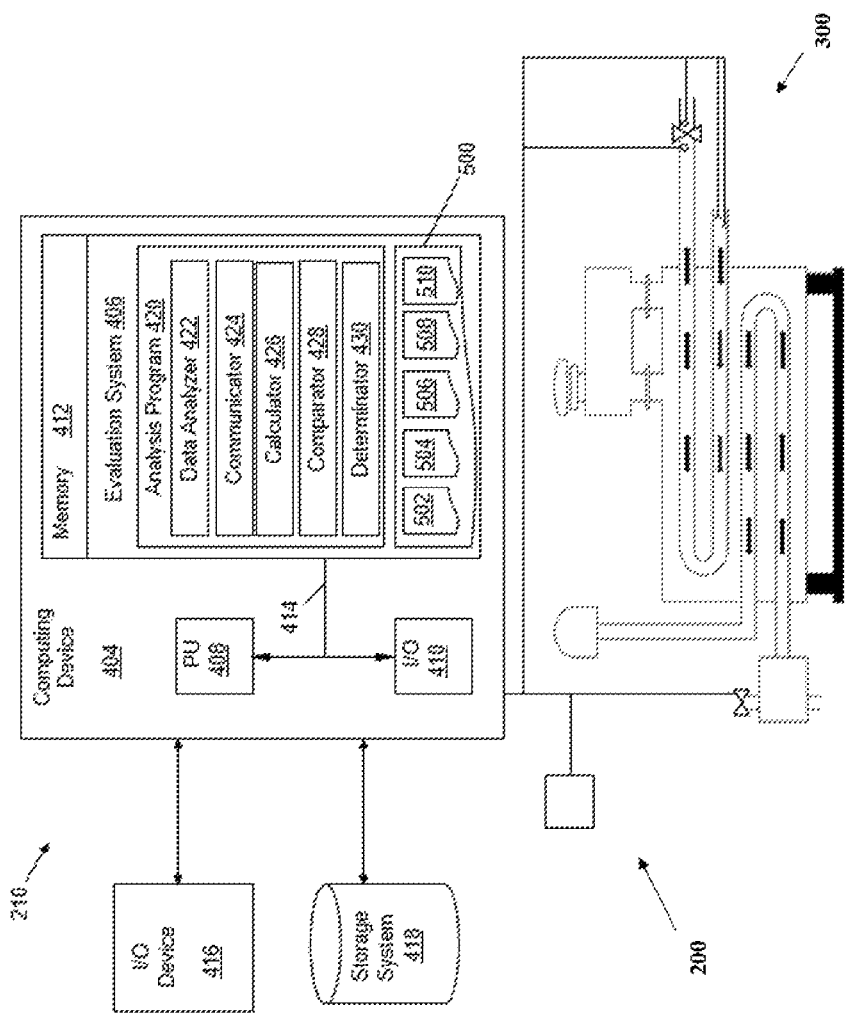
FIG. 3 shows an example computer environment operable to control a water bath heater according to embodiments of the present disclosure.

Referring to FIGS. 2 and 3 together, an example embodiment of controller 210 and sub-components thereof is illustrated with a simplified depiction of system 200. In particular, controller 210 can include a computing device 404, which in turn can include an evaluation system 406. The components shown in FIG. 3 are one embodiment of a system for controlling water bath heater 300. As discussed herein, computing device 404 can provide mathematical equation(s) which relate operational fluid conditions and/or other characteristics of water bath heater 300 and/or pressure reduction station 102 (see FIG. 2) and/or GT power plant 104 (see FIG. 1) to each other. Furthermore, embodiments of the present disclosure can adjust an operating parameter of water bath heater 300 to minimally adjust the temperature of fuel gas 318 by a target temperature differential to prevent hydrate and/or ice formation downstream of water bath heater 300 based on, e.g., measurements obtained with sensor(s) 362, 364, 366, 368. Embodiments of the present disclosure may be configured or operated in part by a technician, computing device 404, and/or a combination of a technician and computing device 404. It is understood that some of the various components shown in FIG. 3 can be implemented independently, combined, and/or stored in memory for one or more separate computing devices that are included in computing device 404. Further, it is understood that some of the components and/or functionality may not be implemented, or additional schemas and/or functionality may be included as part of evaluation system 406.

Computing device 404 can include a processor unit (PU) 408, an input/output (I/O) interface 410, a memory 412, and a bus 414. Further, computing device 404 is shown in communication with an external I/O device 416 and a storage system 418. Evaluation system 406 can execute an analysis program 420, which in turn can include, various software components configured to perform different actions, including, for example a data analyzer 422, a communicator 424, a calculator 426, comparator 428 and, a determinator 430. The various modules of evaluation system 406 can use algorithm-based calculations, look up tables, and similar tools stored in memory 412 for processing, analyzing, and operating on data to perform their respective functions. In general, PU 408 can execute computer program code to run software, such as evaluation system 406, which can be stored in memory 412 and/or storage system 418. While executing computer program code, PU 408 can read and/or write data to or from memory 412, storage system 418, and/or I/O interface 410. Bus 414 can provide a communications link between each of the components in computing device 404. I/O device 416 can comprise any device that enables a user to interact with computing device 404 or any device that enables computing device 404 to communicate with the equipment described herein and/or other computing devices. I/O device 416 (including but not limited to keyboards, displays, pointing devices, etc.) can be coupled to controller 210 either directly or through intervening I/O controllers (not shown).

Memory 412 can also include various forms of data 500 pertaining to water bath heater 300, pressure reduction station 102 (see FIG. 1) and/or GT power plant 104 (see FIG. 1), and/or components thereof. As discussed elsewhere herein, controller 210 may, for example, adjust an operating parameter of water bath heater 300 (e.g. control valve 382) based on an identified mathematical equation for target temperature differential for fuel gas 318 to prevent hydrate and/or ice formation during a pressure reduction process downstream of water bath heater 300. To calculate the target temperature differential for fuel gas 318, analysis program 420 of evaluation system 406 can store and interact with data 500 in processes of the present disclosure. For example, operational fluid conditions field 502 can include one or more conditions of fuel gas 318, air 328, burner fuel gas supply 334, etc. at corresponding times. More specifically, each entry of operational fluid conditions 502 can include a single group of operational fluid conditions measured (e.g., with sensor(s) 362, 364, 366, 368) during the operation of water bath heater 300 at a particular point in time, such as temperatures, pressures, etc., of operational fluid (e.g. fuel gas 318). Data 500 can also include a component type field 504 which includes one or more identified types and/or subtypes of component (e.g., with interface 372) of water bath heater 300 and/or pressure reduction station 102 (see FIG. 1) and/or GT power plant 104 (see FIG. 1). For example, component type field 504 may include types of control valves, e.g. the type of control valve 340, as indicated at interface 372. Other conditions and/or component types can be stored elsewhere within data 500 using other fields and/or groups of fields. A set of mathematical equations for calculable conditions of operational fluids, e.g. fuel gas 318, can be stored in an operational fluids condition mathematical equations field 506. Operational fluids condition mathematical equations field 506 may include, for example, one or more systems of equations selected based on a component type for mathematically relating the various analyzed and/or stored operational fluid conditions. For example, operational fluids condition mathematical equations field 506 may include, the following mathematical equation for the hydrate formation temperature of fuel gas 318 selected based on, for example, a global valve, or a type of valve with silencing cage for control valve 340: $T_{gas\_h}=15.975\ln(P_{gas})-46$ wherein $T_{gas\_h}$ is hydrate formation temperature, and $P_{gas}$ is the pressure of fuel gas 318 at inlet 314 of first pipeline 310 measured for example by sensor 364. A mathematical equation for a target temperature differential of fuel gas 318 to prevent downstream formation of hydrate and/or ice can be stored in a target temperature differential mathematical equation field 508. Target temperature differential mathematical equation field 508 may include one or more systems of equations for mathematically relating the various analyzed, stored and/or calculable operational fluid conditions, to a target temperature differential for fuel gas 318 to prevent hydrate and/or ice formation. For example, target temperature differential mathematical equation field 508 may include, the following mathematical equation for the target temperature differential of fuel gas 318 based on a calculable operational fluid condition (e.g. hydrate formation temperature of fuel gas 318) and at least one analyzed condition of fuel gas 318: $T_{target}=T_{gas\_h}-T_{gas}+5$, wherein $T_{target}$ is the target temperature differential for fuel gas 318 to prevent hydrate and/or gas formation, $T_{gas\_h}$ is the calculable hydrate formation temperature of fuel gas 318, and $T_{gas}$ is the temperature of fuel gas 318 at inlet 314 of first pipeline 310 measured for example by sensor 362. It is thereby understood that data 500 can include several measured and/or calculable variables which can be applied to operational fluid condition mathematical equations(s) and/or target temperature differential mathematical equations(s) stored in fields 506 and 508, respectively, to calculate a target temperature differential for fuel gas 318 to prevent hydrate and/or ice formation during a pressure reduction process.

A mathematical model for degradation of a component in water bath heater 300 and/or pressure reduction station 102 (see FIG. 1) and/or GT power plant 104 (see FIG. 1) may optionally be stored in data 500, for example, in component degradation field 510. For example, component degradation mathematical model field 510 may include, for example, the following mathematical model for the degradation of a control valve based on at least one component type and/or on at least one operational fluid condition of fuel gas 318:

$$h_1 + \frac{V_1^2}{2} = h_2 + \frac{V_2^2}{2},$$

wherein $h_1$ is the specific enthalpy of fuel gas 318 before entering the control valve, $V_1^2$ is the fluid velocity of fuel gas 318 before entering the control valve, $h_2$ is the specific enthalpy of fuel gas 318 after leaving the control valve, and $V_2^2$ is the fluid velocity of fuel gas 318 after leaving the control valve. Component degradation mathematical model field 510 may include one or more systems of equations for mathematically relating the various operational fluid conditions and component types to a degradation of a component. For example, component degradation mathematical model field 510 may include one or more systems of equations relating to an operational fluid condition mathematical equation stored in field 506 and/or a target temperature differential mathematical equation stored in field 508 to determine the degradation of a component identified in component type field 504.

Controller 210 can thereby adjust an operating condition of water bath heater 300 in real-time based on the collected data 500. For example, controller 210 can adjust the position of control valve 382 and/or other components of water bath heater 300 to change the temperature of fuel gas 318 by the calculated target temperature differential. In another example, controller 210 can adjust the position of control valve 382 and/or other components of water bath heater 300 to change the temperature of fuel gas 318 based on the optional component degradation model. Controller 210 can adjust control valve 382 and/or other components using control inputs in the form of, e.g., digital commands, instructions, etc., which can be converted into mechanical adjustments of control valve 382 and/or other components. Adjusting control valve 382 can, for example, directly change a flow rate of burner fuel gas supply 334 entering inlet 333 of burner 330, and such changes in flow rate can, for example, indirectly affect other conditions of fuel gas 318 calculated using an operational fluids condition mathematical equations(s) and a target temperature differential mathematical equation(s). As an example, the flow rate of burner fuel gas supply 334 within inlet 333 of burner 330 may affect the temperature (i.e., a temperature in Celsius degrees (° C.)) of air 328 entering second pipeline 320 of water bath heater 300 at inlet 324. The change in temperature of air 328 flowing through second pipeline 320 may, for example, affect the temperature (i.e., a temperature in Celsius degrees (° C.)) of bath fluid 308 in main body 306 of water bath heater 300. The change in temperature of bath fluid 308, may for example, affect the temperature (i.e., a temperature in Celsius degrees (° C.)) of fuel gas 318 flowing through first pipeline 310.

Computing device 404 can comprise any general purpose computing article of manufacture for executing computer program code installed by a user (e.g., a personal computer, server, handheld device, etc.). However, it is understood that computing device 404 is only representative of various possible equivalent computing devices and/or technicians that may perform the various process steps of the disclosure. In addition, computing device 404 can be part of a larger system architecture of controller 210, operable to control various aspects and elements of a machine.

To this extent, in other embodiments, computing device 404 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 404 may include a program product stored on a computer readable storage device, which can be operative to automatically control water bath heater (e.g., control valve 382) when executed.

Figure 4:
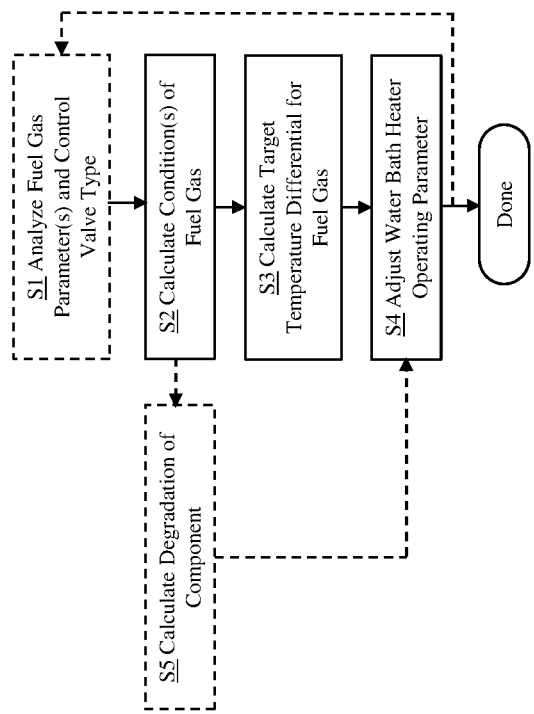
FIG. 4 provides an illustrative flow diagram of a method for controlling a water bath heater according to embodiments of the present disclosure.
Figure 5:
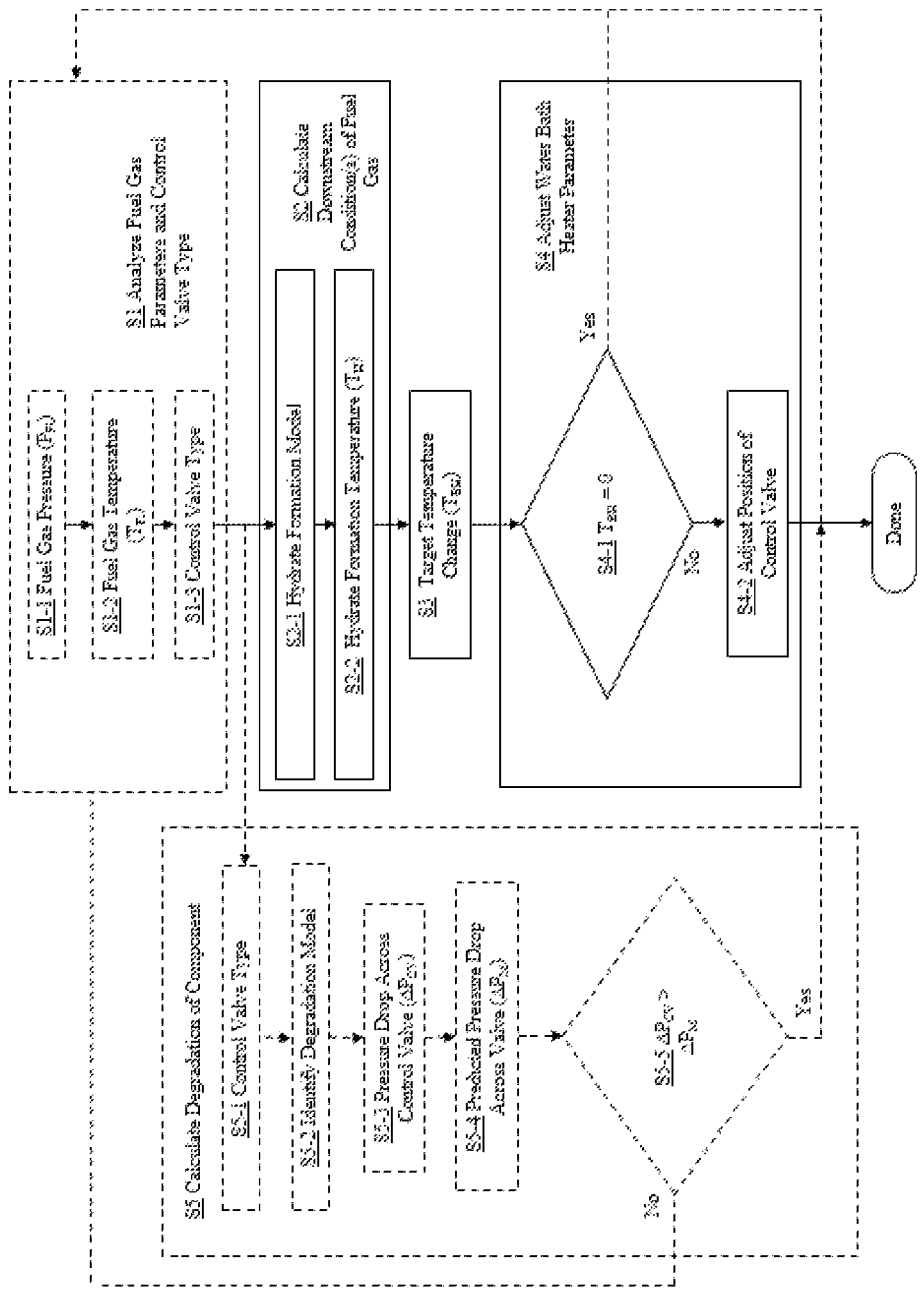
FIG. 5 provides an illustrative flow diagram of a method for controlling a water bath heater according to further embodiments of the present disclosure.

Referring to FIGS. 2-4 together, steps for controlling a water bath heater in embodiments of the present disclosure are shown. The steps shown in FIG. 4 and described herein provide a general process overview for implementing embodiments of the present disclosure, and are discussed by reference to a group of illustrative examples. In addition, the process flow illustrated in FIG. 4 can be implemented, e.g., by way of system(s) 200 including controller(s) 210 therein. During the operation of a water bath heater such as water bath heater 300, a data analyzer 422 of analysis program 420 of controller 210 may, for example, analyze, receive, identify, calculate and/or otherwise obtain a set of operational fluid conditions, e.g. fuel gas 318 conditions, and a component type, e.g. valve type of control valve 340 at step S1 (in phantom). The analysis of conditions and/or component types in step S1 can be performed using sensor(s) 362, 364, 366, 368, and/or interface 372, and/or at least partially with controller 210. Step S1 thereby can be embodied as a separate or preliminary step, and is shown in phantom in FIG. 4 for this reason. In an embodiment, these and other operational fluid conditions and/or component types for water bath heater 300 and/or pressure reduction station 102 (see FIG. 1) and/or GT power plant 104 (see FIG. 1) can be transmitted to controller 210, e.g., through sensor(s) 362, 364, 366, 368 and/or interface 372 and/or other instruments configured to measure, derive, etc., one or more operational fluid conditions and/or component type to water bath heater 300. As discussed herein, the operational fluid conditions and/or component types analyzed in step S1 can include, e.g., a temperature, pressure, etc., of operational fluids (e.g. fuel gas 318) and/or control valve type, pipeline type, etc., and can be stored as data 500 in operational fluid condition field 502 or component type field 504. Some example implementations, sub-steps, etc., of step S1 are shown in FIG. 5 and discussed in detail elsewhere herein.

After analyzing operational fluid conditions and/or component types in step S1, the flow can proceed to step S2 of calculating one or more calculable conditions of an operational fluid during operation of water bath heater 300 and/or pressure reduction station 102 (see FIG. 1) and/or GT power plant 104 (see FIG. 1). More specifically, communicator 424 of analysis program 420 may, for example, identify an operational fluid condition mathematical equation stored in operational fluid condition mathematical equation field 506, based on a component type analyzed in step S1. Calculator 426 of analysis program 420 may, for example, calculate at least one condition of an operational fluid, based on at least one condition analyzed in step S1. Some example implementations, sub-steps, etc., of step S2 are shown in FIG. 5 and discussed in detail elsewhere herein.

After calculating at least one calculable operational fluid condition in step S2, the flow can proceed to step S3 of calculating a target temperature differential for fuel gas 318 to prevent downstream hydrate and/or ice formation during a pressure reduction process. More specifically, calculator 426 of analysis program 420 may, for example, calculate a target temperature differential for fuel gas 318 using a target temperature differential mathematical equation, stored in target temperature differential mathematical equation field 508, based on at least one condition of an operational fluid analyzed in step S1, and at least operational fluid condition calculated in step S2. Some example implementations, sub-steps, etc., of step 3 are shown in FIG. 5 and discussed in detail elsewhere herein.

After calculating a target temperature differential for fuel gas 318 in step S3, the flow can proceed to step S4 of adjusting one or more operating parameters of water bath heater 300 based on the target temperature differential for fuel gas 318 calculated in step S3. For example, comparator 428 may, for example compare the target temperature differential for fuel gas 318 to the value zero. Based on comparator 428, determinator 430 may, for example, determine whether communicator 424 should direct controller 210 to adjust an operating parameter of water bath heater 300. Based on determinator 430, communicator 424 may, for example direct controller 210 to automatically adjust a position of a control valve of water bath heater 300 and/or other aspects of water bath heater 300 which may directly and/or indirectly affects the temperature of fuel gas 318. The action(s) implemented by controller 210 in step S4 can vary based on the operation of water bath heater 300. Once step S4 is complete, the process may for example, flow to "Done." Additionally, the process may, for example flow back to step S1 and repeat the process to continuously adjust the operating parameter of water bath heater 300 to continuously adjust the temperature of fuel gas 318 by a target temperature differential. Some example implementations, sub-steps, etc., of step S4 are shown in FIG. 5 and discussed in detail elsewhere herein.

In addition to calculating conditions of fuel gas 318 and a target temperature differential for fuel gas 318 in real-time during operation, embodiments of the present disclosure also provide optional component degradation calculations, e.g. step S5 (in phantom). More specifically, data analyzer 422 may obtain a component type. Further, for example, data analyzer 422 of analysis program 420 may identify a component degradation mathematical model stored in component degradation mathematical model field 510 based on the component type obtained by data analyzer 422. Data analyzer 422 may, for example, receive operational fluid condition(s) based on the identified degradation model. Calculator 426 may, for example, calculate a predicted value for operational fluid condition(s) for the component, based the identified component degradation model. Comparator 428 may, for example, compare the operational fluid conditions analyzed by data analyzer 422 and the predicted value of the operational fluid condition(s). Determinator 430 may, for example, based on comparator 428 determine whether communicator 424 should direct controller 210 to adjust an operating parameter of water bath heater 300. Communicator 424 may, for example, based on determinator 430, direct controller 210 to automatically adjust an operating parameter of water bath heater 300 based on results of comparator 428. Some example implementations, sub-steps, etc., of step 5 are shown in FIG. 5 and discussed in detail elsewhere herein.

Referring to FIGS. 2, 3, and 5 together, processes and sub-processes for controlling the operation of water bath heater 300 are discussed. Step S1 can be implemented in controller 210 substantially in accordance with the overview process flow in FIG. 4 and/or the example embodiments discussed elsewhere herein. For example, data analyzer 422 may receive operational fluid conditions and/or component types including but not limited to: at substep S1-1 a pressure of fuel gas 318 (e.g. at sensor 364 of inlet 314 of first pipeline 310), at substep S1-2 a temperature of fuel gas 318 (e.g. at sensor 362 of inlet 314 of first pipeline 310), and/or at substep S1-3 a type of a control valve downstream of water bath heater 300, e.g. control valve 340 indicated at interface 372.

FIG. 5 also shows an illustrative example of step S2 including substeps S2-1 and S2-2. For example, at substep S2-1, data analyzer 422 may identify a mathematical equation for an operational fluid condition of fuel gas 318, e.g. hydrate formation temperature of fuel gas 318, based on the type of control valve 340 analyzed in substep S1-3. In substep S2-2, for example, calculator 426 may calculate the operational fluid condition of fuel gas 318, i.e. hydrate formation temperature, based on the condition, i.e. pressure, of fuel gas 318 analyzed in substep S1-1.

As shown in the illustrative example of FIG. 5, step S3 can be implemented in controller 210 substantially in accordance with the overview process flow in FIG. 4 and/or the example embodiments discussed elsewhere herein. For example, in step S3, calculator 426 may calculate a target temperature differential for fuel gas 318 based on the condition, i.e. temperature, of gas fuel 318 analyzed in substep S1-2, and the operational fluid condition, e.g., hydrate formation temperature, of fuel gas 318, calculated in substep S2-2.

FIG. 5 also shows an illustrative example of step S4 including substeps S4-1 and S4-2. For example, in substep S4-1, comparator 428 may compare the target temperature differential for fuel gas 318 calculated in step S3 to a zero value. Determinator 430 may, for example, determine whether communicator 424 should direct controller 210 to adjust an operating parameter of water bath heater 300. In a first instance, for example where the target temperature differential for fuel gas 318 is equal to zero, the illustrative process may return to step S1. In a second instance, for example where the target temperature differential for fuel gas 318 is not equal to zero, the illustrative process may flow to substep S4-2, and communicator 424 may, for example, direct controller 210 to automatically adjust an operating parameter of water bath heater 300, e.g. adjust the positions of control valve 382 of burner 330 of water bath heater 300. Substep S4-2 is complete, the process may for example, flow to "Done." Additionally, once substep S4-2 is complete, the process may also, for example as shown in phantom, flow back to step S1 to continuously monitor and adjust the operating parameter of the water bath heater.

FIG. 5 also shows an illustrative example of optional step S5 including substeps S5-1, S5-2, S5-3 and S5-4. For example, in substep S5-1, data analyzer 422 may analyze a component type, e.g. control valve 340 downstream of water bath heater 300. In substep S5-2, for example, data analyzer 422 may identify a component degradation model based on the component type, e.g. a control valve degradation model of control valve 340. In substep S5-3, for example, data analyzer 422 may receive an operational fluid condition based on the identified component degradation model, e.g. pressure drop across control valve 340 based on pressures of gas fluid 318 at sensor 366 before control valve 340 and sensor 368 after control valve 340. In substep S5-4, calculator 426 may, for example, calculate a predicted value of the pressure drop across control valve 340 based on the component degradation model identified in substep S5-2. In substep S5-5, comparator 428 may, for example, compare the pressure drop across valve control valve 340, analyzed in substep S5-3 to the predicted value of the pressure drop across control valve 340 predicted by the component degradation model identified in substep S5-4.

Determinator 430 may, for example, based one comparator 428 determine whether communicator 424 should direct controller 210 to adjust an operating parameter of water bath heater 300. In a first instance, for example, where the pressure drop analyzed at substep S5-3 is not less than the predicted pressure drop calculated in substep S5-4, the illustrative process may return to step S1. In a second instance, for example, where the pressure drop analyzed at substep S5-3 is less than the predicted pressure drop calculated in substep S5-4, the illustrative process may flow to substep S4-2 of step S4. In substep S4-2, communicator 424 may, for example, direct controller 210 to automatically adjust an operating parameter of water bath heater 300, e.g., the position of control valve 382 of burner 330 of water bath heater 300. Once substep S4-2 is complete, the process may, for example, flow to "Done." Additionally, once substep S4-2 is complete, the process may also, for example shown in phantom, flow back to step S1 to continuously monitor and adjust the operating parameter of the water bath heater.

Although FIG. 5 includes several sub-processes for steps S1, S2, S3 and S5, it is understood that alternative embodiments may include executing steps S1 and/or S2 and/or S4 and/or S5 in the simplified form illustrated in FIG. 4, and/or omitting and/or rearranging the various optional sub-processes for steps S1 and/or S2 and/or S4 and/or S5 shown in FIG. 5 and described herein.

It is also understood that one or more of the comparisons in steps S4-1, and step S5-5 can be omitted or arranged in a different order, such that analysis program 420 can adjust operating parameters based on selected quantities and/or in a particular order of preference.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a water bath heater for a fuel gas, the method comprising:
    calculating at least one calculable condition of the fuel gas based on at least one first condition of the fuel gas entering the water bath heater and identified component types located downstream of the water bath heater;
    calculating a target temperature differential for the fuel gas based on at least one second condition of the fuel gas entering the water bath heater and the at least one calculable condition; and
    adjusting an operating parameter of the water bath heater thereby adjusting a temperature of the fuel gas leaving the water bath heater by the target temperature differential.

2. The method of claim 1, wherein the at least one first condition of the fuel gas includes a temperature of the fuel gas entering the water bath heater.

3. The method of claim 1, wherein the at least one second condition of the fuel gas includes a pressure of the fuel gas entering the water bath heater.

4. The method of claim 1, wherein the calculating the at least one calculable condition of the fuel gas includes using a model selected based on the identified type of the component.

5. The method of claim 4, wherein the at least one calculable condition includes a hydrate formation temperature.

6. The method of claim 1, wherein the adjusting the operating parameter of the water bath heater includes increasing a fuel flow used by the water bath heater to heat the fuel gas.

7. The method of claim 1, wherein one component of the identified component types is a control valve, and
    wherein the method further comprises determining whether to replace the control valve based on at least one third condition of the fuel gas.

8. The method of claim 7, wherein the at least one third condition includes a pressure change of the fuel gas across the control valve located downstream of the water bath heater.

9. A system for controlling a water bath heater for fuel gas, the system comprising:
    a system controller in communication with a monitoring system of the water bath heater for a fuel gas, the system controller being operable to:
        calculate at least one calculable condition of the fuel gas based on at least one first condition of the fuel gas entering the water bath heater and identified component types located downstream of the water bath heater;
        calculate a target temperature differential for the water bath heater based on at least one second condition of the fuel gas entering the water bath heater and the at least one calculable condition of the fuel gas; and
        adjust an operating parameter of the water bath heater to adjust a temperature of the fuel gas leaving the water bath heater by the target temperature differential.

10. The system of claim 9, wherein the at least one first condition of the fuel gas includes temperature of the fuel gas entering the water bath heater.

11. The system of claim 9, wherein the at least one second condition of the fuel gas includes pressure of the fuel gas entering the water bath heater.

12. The system of claim 9, wherein the at least one calculable condition of the fuel gas includes a hydrate formation temperature.

13. The system of claim 9, wherein the adjust the operating parameter of the water bath heater includes increasing a fuel flow used by the bath heater to heat the fuel gas.

14. The system of claim 9, further comprising a first sensor for measuring a temperature of the fuel gas entering the water bath heater.

15. The system of claim 9, further comprising a second sensor for measuring a pressure of the fuel gas entering the water bath heater.

16. The system of claim 9, further comprising an interface for indicating the identified type of the component located downstream of the water bath heater.

17. A program product stored on a computer readable storage medium for controlling a water bath heater for a fuel gas, the computer readable storage medium comprising program code for causing a computer system to:
    calculate at least one calculable condition of the fuel gas based on at least one first condition of the fuel gas entering the water bath heater and identified component types located downstream of the water bath heater;
    calculate a target temperature differential for the fuel gas based on at least one second condition of the fuel gas entering the water bath heater and the at least one calculable condition of the fuel gas; and
    adjust an operating parameter of the water bath heater to adjust a temperature of the fuel gas leaving the water bath heater by the target temperature differential.

18. The program product of claim 17, wherein the at least one first condition of the fuel gas includes temperature of the fuel gas entering the water bath heater.

19. The program product of claim 17, wherein the at least one second condition of the fuel gas includes pressure of the fuel gas entering the water bath heater.

20. The program product of claim 17, wherein the at least one calculable condition includes a hydrate formation temperature.

* * * * *